United States Patent
Kim et al.

(10) Patent No.: US 12,126,020 B2
(45) Date of Patent: Oct. 22, 2024

(54) POSITIVE ELECTRODE AND LITHIUM SECONDARY BATTERY INCLUDING THE SAME

(71) Applicant: LG Energy Solution, Ltd., Seoul (KR)

(72) Inventors: Dong Hwi Kim, Daejeon (KR); Hak Yoon Kim, Daejeon (KR); So Ra Baek, Daejeon (KR); Hyuck Hur, Daejeon (KR); Hyeong Il Kim, Daejeon (KR); Seul Ki Chae, Daejeon (KR); Wang Mo Jung, Daejeon (KR); Dong Hun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/922,833

(22) PCT Filed: Jan. 28, 2022

(86) PCT No.: PCT/KR2022/001654
§ 371 (c)(1),
(2) Date: Nov. 2, 2022

(87) PCT Pub. No.: WO2022/164281
PCT Pub. Date: Aug. 4, 2022

(65) Prior Publication Data
US 2023/0155127 A1    May 18, 2023

(30) Foreign Application Priority Data
Jan. 29, 2021  (KR) .......... 10-2021-0012872

(51) Int. Cl.
*H01M 4/525*    (2010.01)
*H01M 4/02*    (2006.01)
*H01M 10/052*   (2010.01)

(52) U.S. Cl.
CPC ......... *H01M 4/525* (2013.01); *H01M 10/052* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2011/0123866 A1* 5/2011 Pan ................ H01M 4/525
427/458
2012/0052400 A1  3/2012 Kim et al.
(Continued)

FOREIGN PATENT DOCUMENTS

CN  110429252 A  11/2019
CN  111081993 A  4/2020
(Continued)

OTHER PUBLICATIONS

Wagner, A. C.,et. al.. (2020). Hierarchical structuring of NMC111-cathode materials in lithium-ion batteries: an in-depth study on the influence of primary and secondary particle sizes on electrochemical performance. ACS Applied (Year: 2020).*
(Continued)

*Primary Examiner* — Haroon S. Sheikh
*Assistant Examiner* — Claire A Rutiser
(74) *Attorney, Agent, or Firm* — Lerner David LLP

(57) ABSTRACT

A positive electrode and a lithium secondary including the same is disclosed herein. In some embodiments, the positive electrode includes a positive electrode current collector, a first positive electrode active material layer and a second positive electrode active material layer sequentially stacked on the positive electrode current collector, wherein the first positive electrode active material layer and the second positive electrode active material layer include a bimodal
(Continued)

positive active material, the first positive electrode active material layer includes small-diameter particles in the form of single particles, and the second positive electrode active material layer includes small-diameter particles in the form of secondary particles. The positive electrode has improved capacity, efficiency, lifespan, output properties, and thermal stability.

12 Claims, 2 Drawing Sheets

(56) References Cited

U.S. PATENT DOCUMENTS

| | | | |
|---|---|---|---|
| 2014/0027679 A1* | 1/2014 | Kim | H01M 4/485 423/598 |
| 2015/0010819 A1 | 1/2015 | Lee et al. | |
| 2016/0013480 A1 | 1/2016 | Sikha et al. | |
| 2017/0365858 A1* | 12/2017 | Yun | H01M 4/525 |
| 2019/0312259 A1 | 10/2019 | Baek et al. | |
| 2019/0393479 A1 | 12/2019 | Kim et al. | |
| 2020/0006758 A1* | 1/2020 | Wi | H01M 4/625 |
| 2020/0083524 A1 | 3/2020 | Baek et al. | |
| 2020/0099094 A1* | 3/2020 | Isono | H01M 4/366 |
| 2020/0119341 A1 | 4/2020 | Baek et al. | |
| 2020/0127276 A1 | 4/2020 | Kim et al. | |
| 2020/0185714 A1 | 6/2020 | Han et al. | |
| 2020/0343536 A1 | 10/2020 | Suh et al. | |
| 2020/0388830 A1 | 12/2020 | Lee et al. | |
| 2020/0403228 A1 | 12/2020 | Kim et al. | |
| 2020/0411859 A1 | 12/2020 | Kim et al. | |
| 2021/0005877 A1* | 1/2021 | Kim | H01M 4/525 |
| 2021/0167365 A1* | 6/2021 | Kim | H01M 4/525 |
| 2021/0296640 A1 | 9/2021 | Yoon et al. | |
| 2021/0313563 A1 | 10/2021 | Guo et al. | |
| 2022/0020978 A1 | 1/2022 | Yang et al. | |
| 2022/0029158 A1 | 1/2022 | Takamori | |
| 2022/0059832 A1 | 2/2022 | Han et al. | |
| 2023/0140577 A1* | 5/2023 | Nam | H01M 4/525 252/182.1 |

FOREIGN PATENT DOCUMENTS

| | | | |
|---|---|---|---|
| CN | 111788724 A | | 10/2020 |
| JP | 2020087879 A | | 6/2020 |
| KR | 20120020896 A | | 3/2012 |
| KR | 20150006283 A | | 1/2015 |
| KR | 20190001566 A | | 1/2019 |
| KR | 20190024680 A | * | 3/2019 |
| KR | 20190051864 A | | 5/2019 |
| KR | 20190093453 A | | 8/2019 |
| KR | 20190133456 A | * | 12/2019 |
| KR | 20190143088 A | | 12/2019 |
| KR | 20200030287 A | | 3/2020 |
| KR | 20200043612 A | | 4/2020 |
| KR | 20200070649 A | | 6/2020 |
| KR | 20200117496 A | | 10/2020 |
| WO | 2019-132332 A1 | | 7/2019 |
| WO | 2019-225969 A1 | | 11/2019 |
| WO | 2020-122497 A1 | | 6/2020 |
| WO | 2020179149 A1 | | 9/2020 |

OTHER PUBLICATIONS

International Search Report for Application No. PCT/KR2022/001654 mailed May 13, 2022, 2 pages.

Extended European Search Report including Written Opinion for Application No. 22746307.2 dated Aug. 12, 2024. 9 pgs.

* cited by examiner

[FIG. 1]
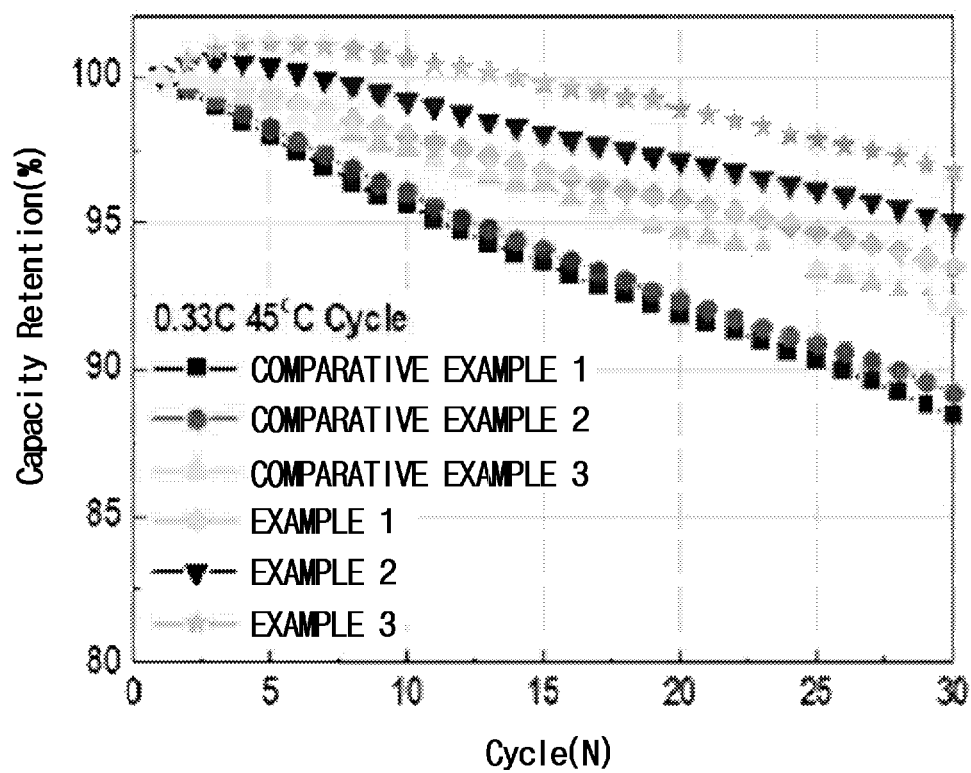

[FIG. 2]
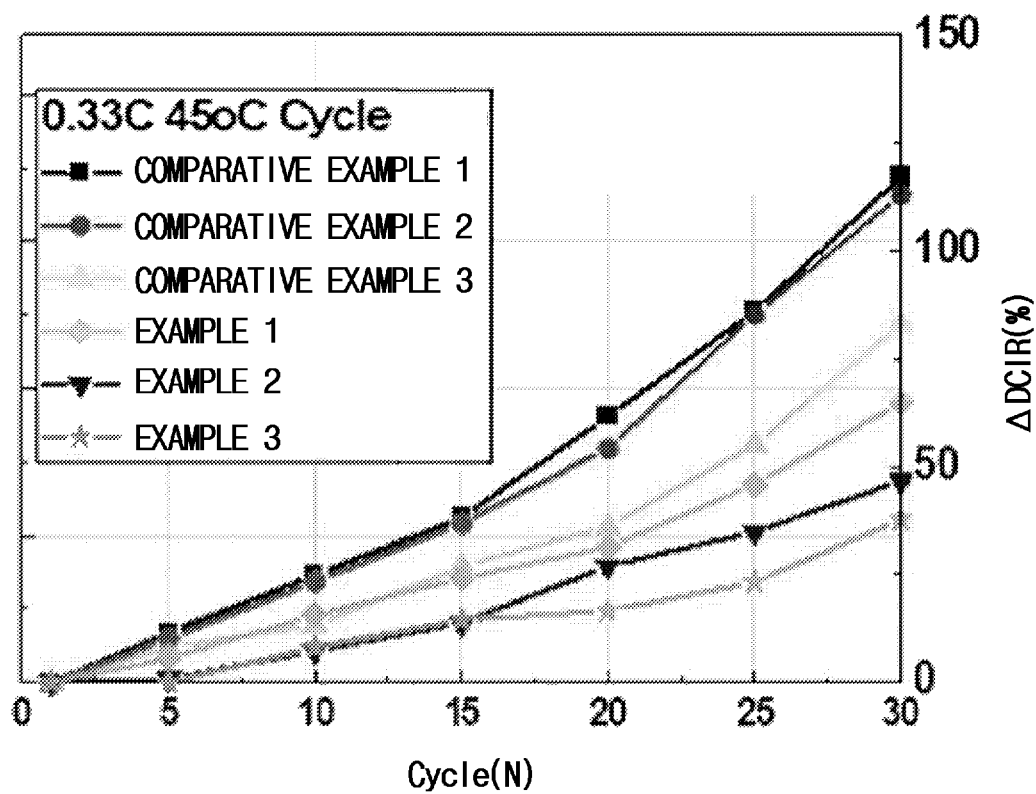

POSITIVE ELECTRODE AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2022/001654, filed on Jan. 28, 2022, which claims the benefit of Korean Patent Application No. 10-2021-0012872, filed on Jan. 29, 2021, in the Korean Intellectual Property Office, the disclosures of which are incorporated by reference herein.

TECHNICAL FIELD

The present disclosure relates to a positive electrode including a multi-layered positive electrode active material layer and a lithium secondary battery including the positive electrode.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal composite oxide is used. Among such lithium transition metal composite oxides, a lithium cobalt composite metal oxide such as $LiCoO_2$, which has a high functional voltage and excellent capacity properties, has been mainly used. However, $LiCoO_2$ is very poor in thermal properties due to the destabilization of a crystal structure according to de-lithium, and also, is expensive. Therefore, $LiCoO_2$ has a limitation in being used as a power source in a field such as an electric vehicle or the like in a large amount.

As a material to replace $LiCoO_2$, a lithium manganese composite metal oxide ($LiMnO_2 \cdot LiMn_2O_4$, and the like), a lithium iron phosphate compound ($LiFePO_4$ and the like), or a lithium nickel composite metal oxide ($LiNiO_2$ and the like) and the like has been developed. Among these materials, research and development has been more actively conducted on a lithium nickel composite metal oxide which has a high reversible capacity of about 200 mAh/g to easily implement a high capacity battery. However, when compared with $LiCoO_2$, $LiNiO_2$ has poor thermal stability. Furthermore, $LiNiO_2$ has a problem in that when an internal short circuit occurs due to external pressure or the like in a charged state, a positive electrode active material itself is decomposed, causing the rupture and ignition of a battery.

Accordingly, as a method for improving the thermal stability of $LiNiO_2$, which is low, while maintaining the excellent reversible capacity thereof, a nickel cobalt manganese-based lithium composite transition metal oxide in which a part of Ni is substituted with Co and Mn, a nickel cobalt aluminum-based lithium composite transition metal oxide in which a part of Ni is substituted with Co and Al, a nickel cobalt manganese aluminum-based composite transition metal oxide in which a part of Ni is substituted with Co, Mn, and Al, and the like have been developed.

Meanwhile, when a high-capacity lithium transition metal oxide is used, oxidation stability at high voltages is lowered, thereby deteriorating stability, and a large number of cracks are generated between particles during long-term charging and discharging, thereby disconnecting a conductive path, which causes an increase in cycle resistance.

Therefore, there is a demand for the development of a positive electrode for a lithium secondary battery in which capacity, efficiency, lifespan, output properties, and thermal stability are all improved.

DISCLOSURE OF THE INVENTION

Technical Problem

An aspect of the present disclosure provides a positive electrode for a lithium secondary battery in which capacity, efficiency, lifespan, output properties, and thermal stability are all improved.

Technical Solution

According to an aspect of the present disclosure, there is provided a positive electrode for a lithium secondary, the positive electrode including a positive electrode current collector, and a first positive electrode active material layer and a second positive electrode active material layer sequentially stacked on the positive electrode current collector, wherein the first positive electrode active material layer and the second positive electrode active material layer include a bimodal positive electrode active material, the first positive electrode active material layer includes small-diameter particles in the form of single particles, and the second positive electrode active material layer includes small-diameter particles in the form of secondary particles.

According to another aspect of the present disclosure, there is provided a lithium secondary battery including the positive electrode.

Advantageous Effects

A positive electrode for a lithium secondary battery according to the present disclosure includes a two-layered positive electrode active material layer satisfying specific conditions, so that capacity, efficiency, lifespan, output properties, and thermal stability may all be improved.

BRIEF DESCRIPTION OF THE DRAWINGS

FIG. 1 is a view showing the capacity retention properties of half-cells manufactured using positive electrode active materials prepared in each of Examples and Comparative Examples; and FIG. 2 is a view showing the resistance increase properties of half-cells manufactured using positive electrode active materials prepared in each of Examples and Comparative Examples.

MODE FOR CARRYING OUT THE INVENTION

It will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the disclosure, based on the principle that an inventor may properly define the meaning of the words or terms to best explain the disclosure.

In the present specification, it should be understood that the term "include," "comprise," or "have" is intended to specify the presence of stated features, numbers, steps, elements, or combinations thereof, but do not preclude the presence or addition of one or more other features, numbers, steps, elements, or combinations thereof.

In the present specification, an 'average particle diameter ($D_{50}$)' may be defined as a particle diameter corresponding to 50% of volume accumulation in a particle diameter distribution curve. The average particle diameter ($D_{50}$) may be measured by, for example, a laser diffraction method. For example, the average particle diameter ($D_{50}$) of the positive electrode active material may be measured by a method in which particles of the positive electrode active material are dispersed in a dispersion medium, and then introduced into a commercially available laser diffraction particle size measurement device (for example, HORIBA Corporation's LA-960) to be irradiated with ultrasonic waves of about 28 kHz to an output of 60 W. Thereafter, the average particle diameter ($D_{50}$) which corresponds to 50% of volume accumulation in the measurement device may be calculated.

In the present specification, a 'positive electrode active material in the form of a single particle' is a concept in contrast to a positive electrode active material in the form of a spherical secondary particle formed by the aggregation of several tens to hundreds of primary particles manufactured by a typical method, and means a positive electrode active material composed of 10 or fewer primary particles. Specifically, in the present disclosure, the positive electrode active material in the form of a single particle may be a single particle composed of one primary particle, or may be in the form of a secondary particle in which several primary particles are aggregated.

In the present specification, a 'primary particle' means the minimum unit of particles recognized when observing a positive electrode active material through a scanning electron microscope (SEM), and a 'secondary particle' means a secondary structural body formed by the aggregation of a plurality of primary particles.

In the present specification, a 'particle' refers to a granule of a micro unit, which may be divided into a 'grain' having a crystal form of several tens of nano units when enlarged and observed. When the grain is further enlarged and observed, a divided region in the form in which atoms form a lattice structure in a certain direction may be identified, which is referred to as a 'crystal grain.' A particle size observed in XRD is defined as a crystal grain size. The crystal grain size may be quantitatively obtained through the Scherrer equation using XRD data.

In the present specification, over-firing means firing at a temperature of about 50° C. to 100° C. higher than a typically suitable firing temperature when preparing a positive electrode active material. For example, when preparing a lithium composite transition metal oxide having a molar ratio of Ni:Co:Mn of 80:10:10 as a positive electrode active material, it is typically known that a suitable firing temperature is 750° C. to 900° C., but over-firing means firing at a temperature of about 50° C. to 100° C. higher than the suitable firing temperature.

Hereinafter, the present disclosure will be described in more detail.

Positive Electrode

The present inventors have discovered that when a positive electrode includes a positive electrode active material layer composed of two layers, wherein a first positive electrode active material layer formed on a positive electrode current collector includes a positive electrode active material in the form of a secondary particle and a positive electrode active material in the form of a single particle, which have different average particle diameters ($D_{50}$), and a second positive electrode active material layer formed on the first positive electrode active material layer includes two types of positive electrode active materials which are in the form of a secondary particle and have different average particle diameters ($D_{50}$), a lithium secondary battery having excellent capacity, efficiency, lifespan, output properties, and thermal stability may be implemented, and have completed the present disclosure.

A positive electrode of the present disclosure includes a positive electrode current collector, and a first positive electrode active material layer and a second positive electrode active material layer sequentially stacked on the positive electrode current collector. The first positive electrode active material layer and the second positive electrode active material layer may include a bimodal positive electrode active material. That is, the first positive electrode active material layer may include a large-diameter particle (first positive electrode active material) and a small-diameter particle (second positive electrode active material), and the second positive electrode active material layer may include a large-diameter particle (third positive electrode active material) and a small-diameter particle (fourth positive electrode active material).

The first positive electrode active material layer may include the first positive electrode active material (large-diameter particle) in the form of a secondary particle formed by the aggregation of a plurality of primary particles and the second positive electrode active material (small-diameter particle) of a single particle.

The second positive electrode active material layer may include the third positive electrode active material (large-diameter particle) in the form of a secondary particle formed by the aggregation of a plurality of primary particles and the fourth positive electrode active material (small-diameter particle) in the form of a secondary particle formed by the aggregation of a plurality of primary particles.

That is, the present disclosure provides the positive electrode for a lithium secondary battery in which the first positive electrode active material has an average particle diameter ($D_{50}$) greater than that of the second positive electrode active material, and the third positive electrode active material has an average particle diameter ($D_{50}$) greater than that of the fourth positive electrode active material. The first positive electrode active material may be the same as the third positive electrode active material.

When a first positive electrode active material layer is present on the positive electrode current collector, and the second positive electrode active material layer is present on the first positive electrode active material layer, a heat transfer rate is slow since there is a buffer layer present, so that the thermal stability may be improved compared with a case in which only the first or second positive electrode active material layer is present on the positive electrode current collector, and by suitably adjusting the thickness ratio of the first positive electrode active material layer and the second positive electrode active material layer and the ratio of an active material, a conductive material, and a binder which are included in each layer, the resistance and output of a battery including the positive electrode may be further improved. Meanwhile, when a second positive electrode active material layer is present on the positive electrode current collector, and the first positive electrode active material layer is present on the second positive electrode active material layer, positive electrode active material particles on the surface portion of an electrode are highly likely to crack during roll-pressing, so that there are disadvantages in terms of lifespan and resistance.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the current collector to improve the adhesion of the positive electrode active material. For example, the positive electrode current collector may be used in various forms such as a film, a sheet, a foil, a net, a porous body, a foam, a non-woven body, and the like.

According to the present disclosure, the thickness ratio of the first positive electrode active material layer and the second positive electrode active material layer may be 3:7 to 7:3, specifically 5:5 to 6:4. When the thickness ratio of the first positive electrode active material layer and the second positive electrode active material layer is in the above rage, positive electrode active material particles on the surface of the positive electrode are prevented from cracking, so that there is an advantage in that resistance and thermal stability are improved.

According to the present disclosure, the first positive electrode active material, the second positive electrode active material, the third positive electrode active material, and the fourth positive electrode active material may each independently have the composition represented by Formula 1 below.

$$Li_x[Ni_aCo_bM^1_cM^2_d]O_2 \quad \text{[Formula 1]}$$

In Formula 1 above, the $M^1$ is one or more selected from Mn and Al, the $M^2$ is one or more selected from B, Mg, Ca, Ti, V, Cr, Fe, Zn, Ga, Y, Zr, Nb, Mo, Ta, and W, and $0.9 \leq x \leq 1.1$, $0.7 \leq a < 1$, $0 < b < 0.3$, $0 < c < 0.3$, $0 \leq d \leq 10.1$, and $a+b+c+d=1$.

The a represents the atomic fraction of nickel among metal elements in an active material excluding lithium, and the a may satisfy $0.7 \leq a < 1$, $0.8 \leq a < 1$, or $0.85 \leq a \leq 0.95$.

The b represents the atomic fraction of cobalt among metal elements in an active material excluding lithium, and the b may satisfy $0 < b < 0.3$, $0 < b < 0.2$, $0.01 \leq b < 0.2$, or $0.02 \leq b \leq 0.1$.

The c represents the atomic fraction of a $M^1$ element among metal elements in an active material excluding lithium, and the c may satisfy $0 < c < 0.3$, $0 < c < 0.2$, $0.01 \leq c < 0.2$, or $0.02 \leq c \leq 0.1$.

The d represents the atomic fraction of a $M^2$ element among metal elements in an active material excluding lithium, and the d may satisfy $0 \leq c \leq 10.1$ or $0 \leq c \leq 0.05$.

According to the present disclosure, the first positive electrode active material may have an average particle diameter ($D_{50}$) of 5 μm to 20 μm, specifically 8 μm to 18 μm, more specifically 10 μm to 16 μm, and the second positive electrode active material may have an average particle diameter ($D_{50}$) of 3 μm to 10 μm, specifically 4 μm to 10 μm, more specifically 4 μm to 8 μm. When the average particle diameter ($D_{50}$) of the first positive electrode active material and the average particle diameter ($D_{50}$) of the second positive electrode active material simultaneously satisfy the above ranges, there are advantages in that the energy density of the positive electrode is large, and also, packing between the positive electrode active materials is facilitated during roll-pressing.

According to the present disclosure, the third positive electrode active material may have an average particle diameter ($D_{50}$) of 5 μm to 20 μm, specifically 8 μm to 18 μm, more specifically 10 μm to 16 μm, and the fourth positive electrode active material may have an average particle diameter ($D_{50}$) of 3 μm to 10 μm, specifically 4 μm to 10 μm, more specifically 4 μm to 8 μm. When the average particle diameter ($D_{50}$) of the third positive electrode active material and the average particle diameter ($D_{50}$) of the fourth positive electrode active material simultaneously satisfy the above ranges, there are advantages in that the energy density of the positive electrode is large, and also, packing between the positive electrode active materials is facilitated during roll-pressing.

The crystal grain size of the first positive electrode active material may be 100 nm to 150 nm, and the crystal grain size of the second positive electrode active material may be 200 nm to 250 nm. In addition, the crystal grain size of the third positive electrode active material may be 100 nm to 150 nm, and the crystal grain size of the fourth positive electrode active material may be 70 nm to 100 nm.

When the crystal grain sizes of the first and third positive electrode active materials are in the above ranges, there may be fewer cracks present in positive electrode active material particles, and when the crystal grain size of the second positive electrode active material is in the above range, not only there may be fewer cracks present in positive electrode active material particles, but also the BET specific surface area is small, so that side reactions may hardly occur.

The BET specific surface area of the first positive electrode active material may be 0.3 m²/g to 0.7 m²/g, and the BET specific surface area of the second positive electrode active material may be 0.2 m²/g to 0.4 m²/g. In addition, the BET specific surface area of the third positive electrode active material may be 0.3 m²/g to 0.7 m²/g, and the BET specific surface area of the fourth positive electrode active material may be 0.7 m²/g to 1.2 m²/g.

The BET specific surface area may be measured through the amount of nitrogen gas adsorption at a liquid nitrogen temperature (77 K) using the BELSORP-mini II (Mictrotrac-BEL Corporation), and when the BET specific surface area of each positive active material is in the above range, a side reaction between the positive electrode active material and an electrolyte may be prevented.

According to the present disclosure, the first positive electrode active material layer may include the first positive electrode active material and the second positive electrode active material at a weight ratio of 85:15 to 55:45, specifically 85:15 to 60:40, and more specifically 80:20 to 70:30. In this case, it may be advantageous in terms of the capacity properties and roll-pressing density properties of a battery.

The sum of the content of the first positive electrode active material and the content of the second positive electrode active material may be 80 wt % to 99 wt %, more specifically 85 wt % to 98 wt % based on the total weight of the first positive electrode active material layer. When included in the above content range, excellent capacity properties may be exhibited.

According to the present disclosure, the second positive electrode active material layer may include the third positive electrode active material and the fourth positive electrode active material at a weight ratio of 85:15 to 55:45, specifically 85:15 to 60:40, and more specifically 80:20 to 70:30. In this case, it may be advantageous in terms of the capacity properties and roll-pressing density properties of a battery.

The sum of the content of the third positive electrode active material and the content of the fourth positive electrode active material may be 80 wt % to 99 wt %, more specifically 85 wt % to 98 wt % based on the total weight of the second positive electrode active material layer. When included in the above content range, excellent capacity properties may be exhibited.

The first positive electrode active material layer and the second positive electrode active material layer may each independently include a conductive material and a binder, together with a positive electrode active material.

The conductive material is used to impart conductivity to an electrode, and according to the present disclosure, the first positive electrode active material layer may further include a dotted conductive material, and the second positive electrode active material layer may further include a dotted conductive material and a linear conductive material. Specific examples of the dotted conductive material may include furnace black, acetylene black, lamp black, and the like, and examples of the linear conductive material may include Low-BET CNT, SWCNT, and the like. When the second positive electrode active material layer further includes a dotted conductive material and a linear conductive material, the conductive network between the positive active material particles is improved, thereby improving electronic conductivity, and since the movement of lithium ions is facilitated, output and lifespan may be improved.

The conductive material may be included in an amount of 1 wt % to 30 wt % based on the total weight of the positive electrode active material layer of each of the first positive electrode active material layer and the second positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of the positive electrode active material layer of each of the first positive electrode active material layer and the second positive electrode active material layer.

The positive electrode may be manufactured according to a typical method for manufacturing a positive electrode. Specifically, the positive electrode may be manufactured by applying a composition for forming a positive electrode active material layer, which is prepared by dissolving or dispersing a positive electrode active material and selectively a binder and a conductive material in a solvent, on a positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Lithium Secondary Battery

In addition, the present disclosure may provide a lithium secondary battery including the positive electrode.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 µm to 500 µm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples of the negative electrode active material may include a carbonaceous material such as artificial graphite, natural graphite, graphitized carbon fiber, and amorphous carbon; a metallic material alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic material and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

The negative electrode active material layer may be included in an amount of 80 wt % to 99 wt % based on the total weight of the negative electrode active material layer.

The binder is a component for assisting in bonding between a conductive material, an active material, and a current collector, and may typically be added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 wt % or less, preferably 5 wt % or less, based on the total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

The negative electrode active material layer may be prepared by applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a nonwoven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present disclosure may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_2$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 wt % to 5 wt % based on the total weight of the electrolyte.

A lithium secondary battery including the positive electrode active material according to the present disclosure described above exhibits excellent capacity, efficiency, lifespan, and output properties, and thus, are useful for portable devices such as a mobile phone, a notebook computer, and a digital camera, and in the field of electric cars such as a hybrid electric vehicle (HEV).

Accordingly, according to the present disclosure, there may be provided a battery module including the lithium secondary battery as a unit cell, and a battery pack including the battery module.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present disclosure is not particularly limited, but may be a cylindrical shape using a can, a square shape, a pouch shape, a coin shape, or the like.

The lithium secondary battery according to the present disclosure may be used in a battery cell which is used as a power source for a small-sized device, and may also be preferably used as a unit cell for a medium- and large-sized battery module including a plurality of battery cells.

Hereinafter, embodiments of the present disclosure will be described in detail so that those skilled in the art may easily carry out the present disclosure. However, the present disclosure may be embodied in many different forms, and is not limited to the embodiments set forth herein.

EXAMPLES AND COMPARATIVE EXAMPLES

The particle shape, composition, average particle diameter ($D_{50}$), crystal grain size, and BET specific surface area of the positive electrode active materials used in each of Examples and Comparative Examples are shown in Table 1 below.

TABLE 1

| | Particle shape | Composition | Average particle diameter ($D_{50}$) (μm) | Crystal grain size (nm) | BET specific surface area ($m^2/g$) |
|---|---|---|---|---|---|
| Positive electrode active material A | Secondary particle | $Li_{1.03}Ni_{0.90}Co_{0.05}Mn_{0.03}Al_{0.02}O_2$ | 13 | 110 | 0.5 |
| Positive electrode active material B | Single particle | $Li_{1.03}Ni_{0.85}Co_{0.07}Mn_{0.05}Al_{0.02}O_2$ | 5.5 | 230 | 0.3 |
| Positive electrode active material C | Secondary particle | $Li_{1.03}Ni_{0.90}Co_{0.05}Mn_{0.03}Al_{0.02}O_2$ | 13 | 110 | 0.5 |
| Positive electrode active material D | Secondary particle | $Li_{1.03}Ni_{0.85}Co_{0.07}Mn_{0.05}Al_{0.02}O_2$ | 5.5 | 90 | 0.9 |

Example 1

The positive electrode active material A and the positive electrode active material B shown in the above table were mixed at a weight ratio of 8:2, and then the mixed positive electrode active material A and positive electrode active material B, carbon black, and a PVdF binder were mixed at a weight ratio of 97.5:1.0:1.5 in an NMP solvent to prepare a first positive electrode slurry. The first positive electrode slurry was applied on one surface of an aluminum current collector (thickness: 12 μm), and dried at 130° C. to form a first positive electrode active material layer on the aluminum current collector.

The positive electrode active material C and the positive electrode active material D shown in the above table were mixed at a weight ratio of 8:2, and then the mixed positive electrode active material C and positive electrode active material D, a conductive material in which carbon black and SWCNT were mixed at a weight ratio of 90:10, and a PVdF binder were mixed at a weight ratio of 97.5:1.0:1.5 in an NMP solvent to prepare a second positive electrode slurry. The second positive electrode slurry was applied on the first positive electrode active material layer, dried at 130° C., and then roll-pressed to manufacture a positive electrode.

At this time, the thickness ratio of the first positive electrode active material layer and the second positive electrode active material layer is 5:5.

Example 2

A positive electrode was manufactured in the same manner as in Example 1, except that the application amounts of the first positive electrode slurry and the second electrode slurry were adjusted such that the thickness ratio of the first positive electrode active material layer and the second positive electrode active material layer was to be 6:4.

Example 3

A positive electrode was manufactured in the same manner as in Example 1, except that the positive electrode active material A and the positive electrode active material B were mixed at a weight ratio of 7:3, and the application amounts of the first positive electrode slurry and the second electrode slurry were adjusted such that the thickness ratio of the first positive electrode active material layer and the second positive electrode active material layer was to be 6:4.

Comparative Example 1

The positive electrode active material C and the positive electrode active material D shown in the above table were mixed at a weight ratio of 8:2, and then the mixed positive electrode active material C and positive electrode active material D, a conductive material in which carbon black and SWCNT were mixed at a weight ratio of 90:10, and a PVdF binder were mixed at a weight ratio of 97.5:1.0:1.5 in an NMP solvent to prepare a positive electrode slurry. The positive electrode slurry was applied on one surface of an aluminum current collector (thickness: 12 μm), dried at 130° C., and then roll-pressed to manufacture a positive electrode.

Comparative Example 2

The positive electrode active material A and the positive electrode active material B shown in the above table were mixed at a weight ratio of 8:2, and then the mixed positive electrode active material A and positive electrode active material B, carbon black, and a PVdF binder were mixed at a weight ratio of 97.5:1.0:1.5 in an NMP solvent to prepare a positive electrode slurry. The positive electrode slurry was applied on one surface of an aluminum current collector (thickness: 12 μm), dried at 130° C., and then roll-pressed to manufacture a positive electrode.

Comparative Example 3

A positive electrode was manufactured in the same manner as in Example 1, except that the second positive electrode slurry was applied on an aluminum current collector to form a second positive electrode active material layer, and the first positive electrode slurry was applied on the second positive electrode active material layer to form a first positive electrode active material layer.

EXPERIMENTAL EXAMPLES

Experimental Example 1

Evaluation of Half-Cell Properties

The positive electrodes manufactured in Examples 1 to 3 and Comparative Examples 1 to 3 were used to manufacture half-cells, and the initial charge and discharge capacity, initial efficiency, lifespan properties, resistance properties, and output properties of each of the half-cells were evaluated.

First, a separator was interposed between the positive electrode manufactured in each of Examples 1 to 3 and Comparative Examples 1 to 3 and a Li metal disk negative electrode to manufacture an electrode assembly, and the electrode assembly was placed inside a battery case, followed by injecting an electrolyte solution into the case to manufacture a lithium secondary battery. At this time, as the electrolyte solution, an electrolyte solution in which LiPF$_6$ of 1 M was dissolved in an organic solvent of EC/EMC (5/5, vol %) was used to manufacture a half-cell.

The half-cell manufactured as described above was charged to a voltage of 4.25 V with a constant current of 0.2 C at 25° C., and then was discharged to a voltage of 3.0 V with a constant current of 0.2 C. The initial charge capacity and initial discharge capacity values are shown in Table 2 below, and the ratio of the initial discharge capacity to the initial charge capacity is set as the initial efficiency (@0.2 C), which is shown in Table 2 below. Except that the C-rate was adjusted to 1.0 C and 2.0 C during charging and discharging, the initial efficiency (@1.0 C) and the initial efficiency (@2.0 C) were obtained in the same manner as described above, and are shown in Table 2 below.

TABLE 2

| | Initial charge capacity (@0.2 C) (mAh/g) | Initial discharge capacity (@0.2 C) (mAh/g) | Initial efficiency (@0.2 C) (%) | Initial efficiency (@0.1 C) (%) | Initial efficiency (@2.0 C) (%) |
|---|---|---|---|---|---|
| Example 1 | 231.2 | 205.6 | 88.9 | 88.2 | 83.6 |
| Example 2 | 231.6 | 206.6 | 89.2 | 90.1 | 86.2 |
| Example 3 | 231.5 | 206.8 | 89.3 | 90.2 | 86.3 |
| Comparative Example 1 | 225.3 | 192.2 | 85.3 | 86.2 | 79.6 |
| Comparative Example 2 | 225 | 191 | 84.9 | 85.2 | 78.6 |
| Comparative Example 3 | 231.8 | 205.7 | 88.8 | 88.1 | 83.2 |

In addition, a charge and discharge cycle was repeated 30 times with a constant current of 0.3 C in the range of 2.5 to 4.25 V at 45° C. to measure the capacity of the half-cell, and the ratio of an N-th cycle capacity to a first cycle capacity in particular is set as the capacity retention (%), which is shown in FIG. 1. In addition, the ratio of the DCIR obtained in an N-th discharge cycle to the DCIR obtained in a first discharge cycle is set as the resistance increase ADCIR (%), which is shown in FIG. 2.

Lastly, the half-cell manufactured as described above was discharged by ΔSOC 30 (SOC 35% to SOC 20%) at −10° C. (low temperature) and 25° C. (room temperature), and changes in voltage value were confirmed through a 0.4 C IR drop for 1,350 seconds, and are shown in Table 3 below.

TABLE 3

| | IR drop (ΔV) | |
|---|---|---|
| | at −10° C. | at 25° C. |
| Example 1 | 0.25 | 0.14 |
| Example 2 | 0.2 | 0.09 |
| Example 3 | 0.18 | 0.07 |
| Comparative Example 1 | 0.58 | 0.34 |
| Comparative Example 2 | 0.50 | 0.28 |
| Comparative Example 3 | 0.3 | 0.2 |

Referring to Tables 2 and 3 and FIGS. 1 and 2 above, it can be confirmed that the batteries including the positive electrodes of Examples 1 to 3 are excellent in all of capacity, efficiency, capacity retention, and low-temperature and room-temperature output properties compared to those of the batteries including the positive electrodes of Comparative Examples 1 to 3. In the case of the batteries including the positive electrodes of Comparative Examples 1 and 2, since the positive electrode active material layer has a single-layered structure, a path through which lithium ions move is small, so that there is a problem in that the capacity, efficiency, capacity retention, low-temperature and room-temperature output properties are poor compared to those of Examples 1 and 2.

In the case of the battery including the positive electrode of Comparative Example 3, positive electrode active material particles present on the surface of the positive electrode are severely cracked, so that there is a problem in the resistance of the battery increases.

Experimental Example 2

Thermal Stability Evaluation (DSC)

The positive electrodes manufactured in Examples 1 to 3 and Comparative Examples 1 to 3 were used to manufacture half-cells, and the thermal stability of each of the half-cells was evaluated.

First, a separator was interposed between the positive electrode manufactured in each of Examples 1 to 3 and Comparative Examples 1 to 3 and a Li metal disk negative electrode to manufacture an electrode assembly, and the electrode assembly was placed inside a battery case, followed by injecting an electrolyte solution into the case to manufacture a lithium secondary battery. At this time, as the electrolyte solution, an electrolyte solution in which $LiPF_6$ of 1 M was dissolved in an organic solvent of EC/DMC/EMC (3/4/3, vol %) was used to manufacture a half-cell.

The half-cells manufactured as described above were charged with a constant current of 0.1 C and disassembled at SOC 100%, and thereafter, the positive electrode obtained from each of the half-cells and a new electrolyte solution were introduced into a cell for measuring DSC, and using a differential scanning calorimeter (Setaram Corporation, high pressure (HP)-DSC) while raising the temperature from room temperature to 500° C. at 10° C./min, the temperature at which a peak with the maximum heat flow appears is shown in Table 4 below.

TABLE 4

|  | DSC Main Peak (° C.) |
| --- | --- |
| Example 1 | 230 |
| Example 2 | 233 |
| Example 3 | 241 |
| Comparative Example 1 | 221 |
| Comparative Example 2 | 224 |
| Comparative Example 3 | 226 |

Referring to Table 4 above, in the case of the batteries including the positive electrodes of Examples 1 to 3, since there is less heat transfer by the buffer layer effect due to the double layer, it can be confirmed that the thermal stability is excellent compared to that of the batteries including the positive electrodes of Comparative Examples 1 and 2. In addition, in the case of the batteries including the positive electrodes of Examples 1 to 3, positive electrode active material particles present on the surfaces of the positive electrodes did not crack as much as in the case of the battery including the positive electrode of Comparative Example 3 (the positive electrode active material particles were hardly cracked), so that it can be confirmed that the thermal stability is excellent.

The invention claimed is:

1. A positive electrode for a lithium secondary battery, comprising:
a positive electrode current collector;
a first positive electrode active material layer; and
a second positive electrode active material layer,
wherein the first and second positive electrode active material layers are sequentially stacked on the positive electrode current collector,
wherein:
the first positive electrode active material layer and the second positive electrode active material layer each independently include a bimodal positive active material comprising small-diameter particles and large-diameter particles,
the small-diameter particles of the first positive electrode active material layer are in the form of single particles, and the small-diameter particles of the second positive electrode active material layer are in the form of secondary particles.

2. The positive electrode of claim 1, wherein:
the large-diameter particles of the first positive electrode active material layer are in the form of secondary particles, and
the large-diameter particles of the second positive electrode active material layer are in the form of secondary particles.

3. The positive electrode of claim 1, wherein a thickness ratio of the first positive electrode active material layer and the second positive electrode active material layer is in a range from 3:7 to 7:3.

4. The positive electrode of claim 1, wherein the bimodal positive electrode active material included in each of the first and second positive electrode active material layers is, independently, represented by Formula 1 below:

$$Li_x[Ni_aCo_bM^1_cM^2_d]O_2 \quad \text{[Formula 1]}$$

wherein in Formula 1 above,
the $M^1$ is one or more selected from Mn and Al,
the $M^2$ is one or more selected from B, Mg, Ca, Ti, V, Cr, Fe, Zn, Ga, Y, Zr, Nb, Mo, Ta, and W, and
$0.9 \leq x \leq 1.1$, $0.7 \leq a < 1$, $0 < b < 0.3$, $0 < c < 0.3$, $0 \leq d \leq 0.1$, and $a+b+c+d=1$.

5. The positive electrode of claim 4, wherein $0.8 \leq a < 1$, $0 < b < 0.2$, $0 < c < 0.2$, and $0 \leq d \leq 0.1$.

6. The positive electrode of claim 1, wherein an average particle diameter ($D_{50}$) of the large-diameter particles included in the first positive electrode active material layer is in a range from 5 μm to 20 μm, and an average particle diameter ($D_{50}$) of the small-diameter particles included in the first positive electrode active material layer is in a range from 3 μm to 10 μm.

7. The positive electrode of claim 1, wherein an average particle diameter ($D_{50}$) of the large-diameter particles included in the second positive electrode active material layer is in a range from 5 μm to 20 μm, and an average particle diameter ($D_{50}$) of the small-diameter particles included in the second positive electrode active material layer is in a range from 3 μm to 10 μm.

8. The positive electrode of claim 1, wherein the first positive electrode active material layer comprises the large-diameter particles and the small-diameter particles at a weight ratio in a range of 85:15 to 55:45.

9. The positive electrode of claim 1, wherein the second positive electrode active material layer comprises the large-diameter particles and the small-diameter particles at a weight ratio in a range of 85:15 to 55:45.

10. The positive electrode of claim 1, wherein the first positive electrode active material layer further comprises a substantially spherical conductive material.

11. The positive electrode of claim 1, wherein the second positive electrode active material layer further comprises a substantially spherical conductive material and a needle type conductive material.

12. A lithium secondary battery comprising the positive electrode according to claim 1.

* * * * *